United States Patent [19]
Ricardo et al.

[11] Patent Number: 5,884,197
[45] Date of Patent: Mar. 16, 1999

[54] WIRELESS PORTABLE TRANSCEIVER ARRANGED FOR PROVIDING ISOLATION BETWEEN RADIO FREQUENCY AND AUDIO SIGNALS

[75] Inventors: George L. Ricardo; William Davis Simmons; Bernie Dee Tull, Jr., all of Shreveport, La.

[73] Assignee: Lucent Technologies Inc., Murray Hill, N.J.

[21] Appl. No.: 565,530

[22] Filed: Nov. 30, 1995

[51] Int. Cl.[6] ....................................... H04B 1/38
[52] U.S. Cl. ........................... 455/575; 455/117; 455/301
[58] Field of Search ................................ 455/89, 90, 117, 455/128, 300, 301, 347, 350, 351, 575; 379/431, 433, 440; 381/154, 155, 169, 338, 170

[56] References Cited

U.S. PATENT DOCUMENTS

| | | | |
|---|---|---|---|
| 3,681,579 | 8/1972 | Schweitzer | 375/343 |
| 4,658,439 | 4/1987 | Danielsen et al. | 455/90 |
| 4,680,676 | 7/1987 | Petratos et al. | 455/301 |
| 5,063,590 | 11/1991 | Koshiishi | 455/89 |
| 5,226,076 | 7/1993 | Baumhauer, Jr. et al. | 381/155 |
| 5,392,461 | 2/1995 | Yokoyama | 455/90 |
| 5,475,876 | 12/1995 | Terada et al. | 455/301 |
| 5,539,834 | 7/1996 | Bartlett et al. | 381/155 |
| 5,555,449 | 9/1996 | Kim | 455/89 |

*Primary Examiner*—Reinhard J. Eisenzopf
*Assistant Examiner*—Sam Bhattacharya
*Attorney, Agent, or Firm*—Samuel R. Williamson; Thomas J. Bean

[57] ABSTRACT

Cross-over modulation between radio frequency circuits and audio circuits is minimized in a wireless portable transceiver by locating all audio circuitry in a first section of the portable transceiver and all radio frequency circuitry in a second, separate section of the portable transceiver. In view of modality considerations in small portable transceivers, an audio signal is either radiated or received in the vicinity of the radio frequency circuitry. Isolation of the audio signal is achieved by routing this signal while in its acoustic form. Since audio signals in an electrical form are not routed around or near the radio frequency circuitry, cross-over modulation does not occur between the radio frequency circuitry and the audio circuitry.

7 Claims, 5 Drawing Sheets

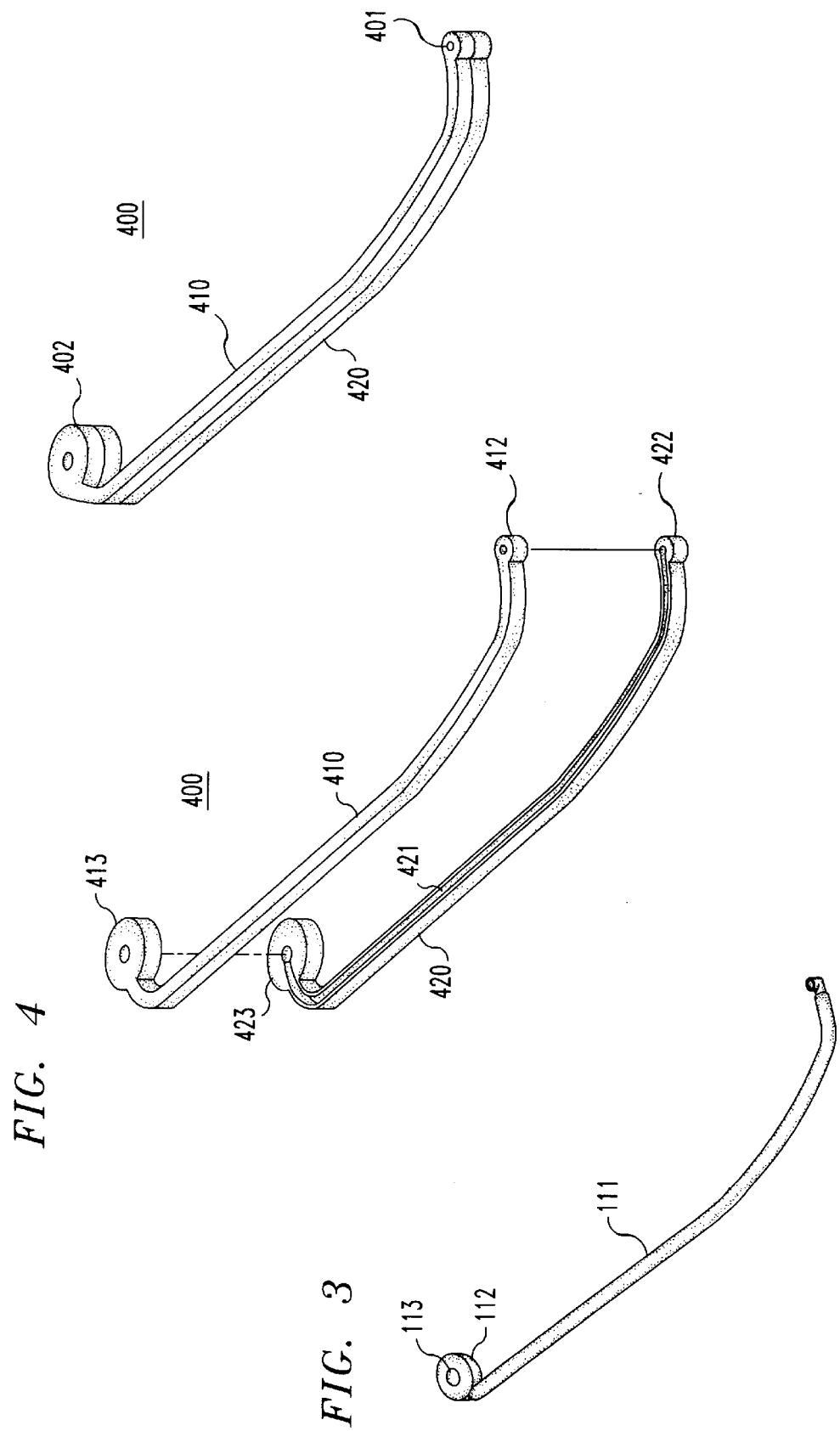

WIRELESS PORTABLE TRANSCEIVER ARRANGED FOR PROVIDING ISOLATION BETWEEN RADIO FREQUENCY AND AUDIO SIGNALS

BACKGROUND OF THE INVENTION

1. Technical Field

This invention relates to wireless transceivers and, more particularly, to an arrangement for providing signal isolation in such transceivers.

2. Description of the Prior Art

Wireless transceivers are in wide use today in various forms including cordless and cellular telephones and other similarly configured portable units. These wireless transceivers have evolved from large bulky units, that operate at low frequencies with an external antenna, to small palm sized units, that operate at high frequencies and utilize an internal antenna.

One of the continuing problems in designing high-frequency wireless transceivers is the undesirable interaction in the form of cross-over modulation that occurs between radio frequency (RF) circuits and audio circuits in such transceivers. When located in close proximity to each other, the audio circuits frequently modulate the RF circuits and cause undesirable interference. This interference may appear in the form of a corrupted transmitted RF signal, resulting in a degraded signal-to-noise ratio in a remote receiver unit. Similarly, the audio circuits can demodulate the RF signals, generating undesirable audible tones which are produced in an audio receiver in the wireless transceiver.

One known solution to this problem commonly practiced by engineers is to utilize RF shielding for the RF circuits and therefore suitably contain the RF energy generated by these circuits in shielded compartments. In that unitary wireless transceivers by design have an audio receiver and an audio transmitter disposed generally at opposite ends of the unit because of modality considerations, it is usually necessary to have an audio circuit near the audio receiver for amplifying the audio output signal and an audio circuit near the audio transmitter for similarly amplifying the audio input signal.

A common audio circuit in the wireless transceiver generally contains the audio processing circuitry necessary for proper operation of this transceiver. Since the audio transmitter and audio receiver, and associated amplifying circuitry for each of these components, are separated in the transceiver unit, it is necessary to provide an isolation path around the RF circuits for at least one of the audio signals for connecting to the common audio circuit. By way of example, the audio signal from the audio transmitter and its amplifying circuitry may by coupled to the common audio circuit which may be configured to also contain the audio receiver and its amplifying circuitry. This arrangement still requires a dedicated routing path for an audio signal, however, which without the proper shielding of the RF circuits may nevertheless interact negatively with the RF signals in the transceiver. Although shielding may be employed to minimize the cross-over modulation between the RF circuits and the audio signal, such shielding is difficult and costly to implement. It is therefore desirable to design a wireless transceiver which provides satisfactory operation without the need for shielding of an audio signal which is routed near or across RF circuits.

SUMMARY OF THE INVENTION

The above disadvantage is avoided in accordance with the present invention wherein isolation between RF circuitry and an audio signal routed across such circuitry is effectively achieved by routing the audio signal while in an acoustic form.

In accordance with a first aspect of the disclosed invention, an audio pipe transports sound or acoustic energy from an acoustic pickup area in a first section of a wireless portable transceiver to a separated, second section in the portable transceiver. The first section of the portable transceiver contains the radio frequency circuitry and the second section of the transceiver contains the audio frequency circuitry. The audio pipe provides the desired isolation by coupling the sound received in the acoustic pickup area to the second section of the transceiver wherein an audio transmitter may be advantageously colocated in close proximity with an audio receiver.

In accordance with a second aspect of the disclosed invention, a molded audio channel, formed from a pair of mating grooves in both an upper and a lower cover for the housing of the wireless portable transceiver, transports sound from an acoustic pickup area in the first section of the portable transceiver to the audio transmitter in the separated, second section in the portable transceiver.

In accordance with a third aspect of the disclosed invention, the audio pipe is configured to extend from the audio receiver located in the second section of the portable transceiver to an acoustic port or opening in the first section of the portable transceiver. In this disclosed aspect of the invention, the audio pipe provides the desired isolation by coupling the sound generated in the audio receiver to the acoustic port.

In accordance with a fourth aspect of the disclosed invention, the molded audio channel is configured to transport sound from the audio receiver located in the second section of the portable transceiver to the acoustic port in the first section of the portable transceiver.

In each of the disclosed embodiments, all RF circuitry is advantageously located in a first section of the portable transceiver. Similarly, all of the audio circuitry is conveniently located in a separate, second section of the portable transceiver. Since no electrical audio signals are routed around or near the RF circuitry, the cross-over modulation due to RF signals and audio signals interacting with each other in the transceiver is minimized.

BRIEF DESCRIPTION OF THE DRAWING

This invention and its mode of operation will be more clearly understood from the following detailed description when read with the appended drawing in which:

FIG. 3 is a perspective view of an audio pipe employed in the present invention;

FIG. 4 is an exploded perspective view of an upper member and a lower member of an audio channel employed in the present invention;

FIG. 5 is a perspective view of the upper member and the lower member of an audio channel positioned in opposed assembly, in accordance with the present invention;

Throughout the drawing, the same elements when shown in more than one figure are designated by the same reference numerals.

DETAILED DESCRIPTION

Figure 1:
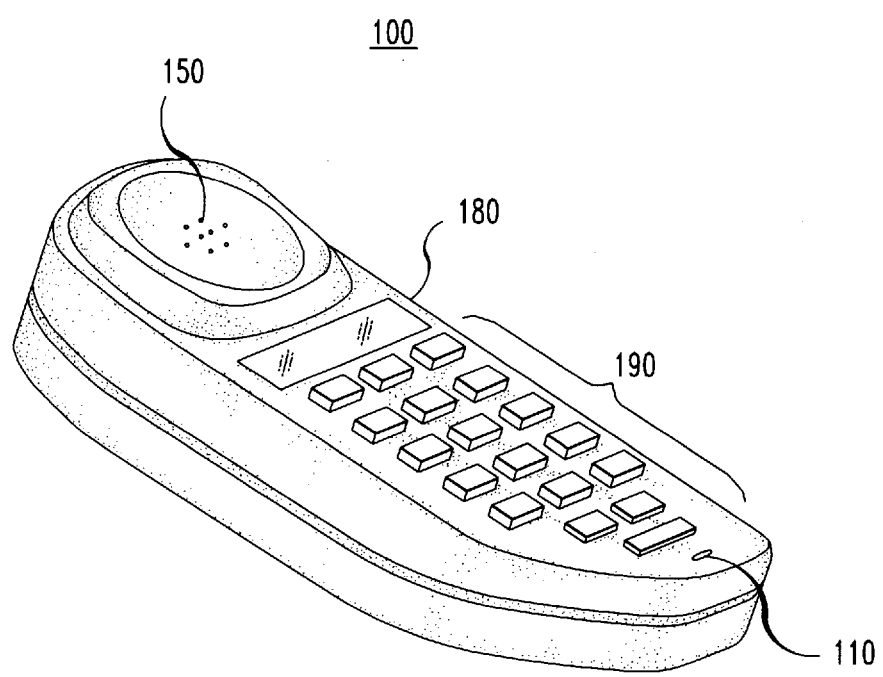
FIG. 1 is a perspective view of a wireless transceiver, usable for incorporating the present invention.

Referring now to FIG. 1, there is shown an illustrative drawing of a wireless transceiver 100 useful for incorporating the structure of and describing the operation of the present invention. The wireless transceiver 100 includes, for example, an input port 110 for receiving acoustic energy from a user of the transceiver, an output port 150 for coupling acoustic energy in the form of speech to the user, a display 180 for viewing by the user, and a conventional key or button array 190 illustrated in the form of a telephone dial pad for the user to enter a telephone number.

The wireless transceiver 100 may provide communications in, by way of illustrative example, a cellular radio system. Various types of cellular radio systems are known in the art and have been otherwise described. One such system is described in *The Bell System Technical Journal*, Volume 58, January 1979, Number 1, particularly in papers entitled "Advanced Mobile Phone Service: Introduction, Background and Objectives" by W. R. Young and "The Cellular Concept" by V. H. MacDonald.

The wireless transceiver 100 may also provide communications suitable for operating in a cordless telephone system. Some cordless telephone systems are described in U.S. Pat. Nos. 4,706,274, 5,044,010 and 5,353,341, for example.

Figure 2:
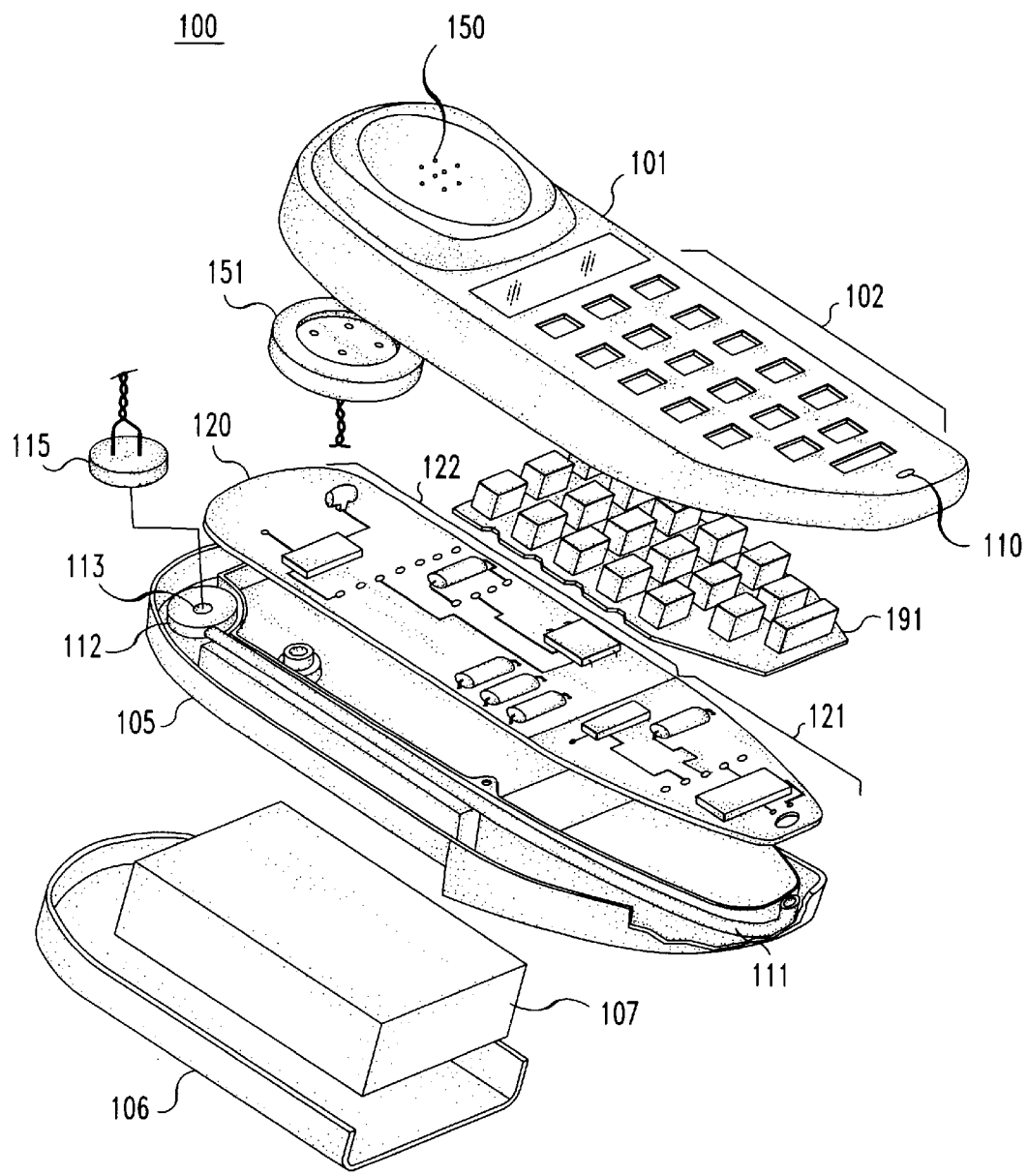
FIG. 2 is an exploded perspective view of some of the components inside the wireless transceiver of FIG. 1, arranged in accordance with the present invention.

With reference now to FIG. 2, and in accordance with a first disclosed embodiment of the invention, there is shown an exploded perspective view of some of the components inside the wireless transceiver 100 of FIG. 1. These components include an upper cover assembly 101 as part of the housing for the wireless transceiver. This upper cover assembly 101 includes the input port 110 for receiving input acoustic energy and the output port 150 for broadcasting or radiating acoustic energy from the transceiver. The upper cover assembly 101 also includes a plurality of openings 102 for accommodating the button array 190 shown in FIG. 1. The button array is assembled on a keypad assembly 191.

The components in the transceiver 100 also include an acoustic or audio receiver 151 for generating the acoustic energy which is radiated through the output port 150. A printed circuit board 120, which includes an RF section 121 for the RF circuits and an audio section 122 for the audio circuits, is also included in the transceiver 100. The printed circuit board is nested in a lower cover assembly 105 for the transceiver 100. Removably attachable to the lower cover assembly 105 is a battery pack cover 106 for housing a battery pack 107 which provides operating power for the transceiver 100.

The components in the transceiver 100 also include, in accordance with the first disclosed embodiment of the invention, an audio or acoustic pipe 111 which extends from an audio transmitter 115 to the input port 110 located in the upper housing assembly 101 of the transceiver 100. The audio pipe 111 couples the acoustic energy from the input port 110 to the audio transmitter 115. The transmitter 115 is advantageously located in the transceiver housing adjacent to the audio receiver 151 where it, like the receiver 151, may be directly connected to the audio section 122 in the transceiver. The audio pipe 111 is a hollow cylindrical extension that may be easily formed using, for example, commonly available Acrylonitrile-Butadiene-Styrene (ABS) plastic material.

The end of audio pipe 111 that couples sound to the audio transmitter 115 is moldably connected to a disk portion 112 which has an opening 113 in its center for emitting the sound collected at the input port 110. This disk portion 112 nests in a recess of the lower cover assembly 105. When the wireless transceiver is assembled, the receiver 115 sits atop the disk portion 112 for making good acoustical coupling with this disk. For clarity, FIG. 3 shows the audio pipe 111 removed from its position in the lower cover assembly 105.

With reference next to FIGS. 4 and 5, in combination, and in accordance with a second disclosed embodiment of the invention, there is shown in FIG. 4 an exploded perspective view of an upper member 410 and a lower member 420 of an audio or acoustic channel 400. Like the audio pipe 111, these members may be formed using ABS plastic material. The lower member 420 has a groove 421 throughout its length. The upper member 410 is a mirror image of the lower member 420 and similarly has a groove throughout its length. Both the upper and lower members 410 and 420 are terminated in disk-like end sections. Small disk-like end sections 412 and 422 are respectively located on one end of both the upper member 410 and the lower member 420. Similarly, large disk-like end sections 413 and 423 are respectively located on the opposite end of both the upper member 410 and the lower member 420.

For forming the channel 400 for coupling the acoustic energy from the input port 110 to the audio transmitter 115, the upper member 410 and the lower member 420 are positioned in opposed assembly by bringing together these two members so that their groves form an acoustic energy conducting channel. The assembly of these two members is shown in FIG. 5.

The acoustic energy enters the channel 400 through an opening 401 which mates with the input port 110 for coupling the acoustic energy to the transmitter 115. A second opening 402 is provided in the channel 400 for mating with the audio transmitter 115.

The channel 400 may be advantageously molded directly into the housing of the transceiver 100 such that the member 410 is a part of the upper housing assembly 101 and the member 420 is a part of the lower housing assembly 105. In this embodiment, the acoustic energy conducting channel is formed simply by bringing together the upper and lower assemblies of the transceiver housing. Alternatively, this channel 400 may, like the audio pipe 111, be assembled separately and then inserted into a suitably modified lower housing assembly.

Figure 6:
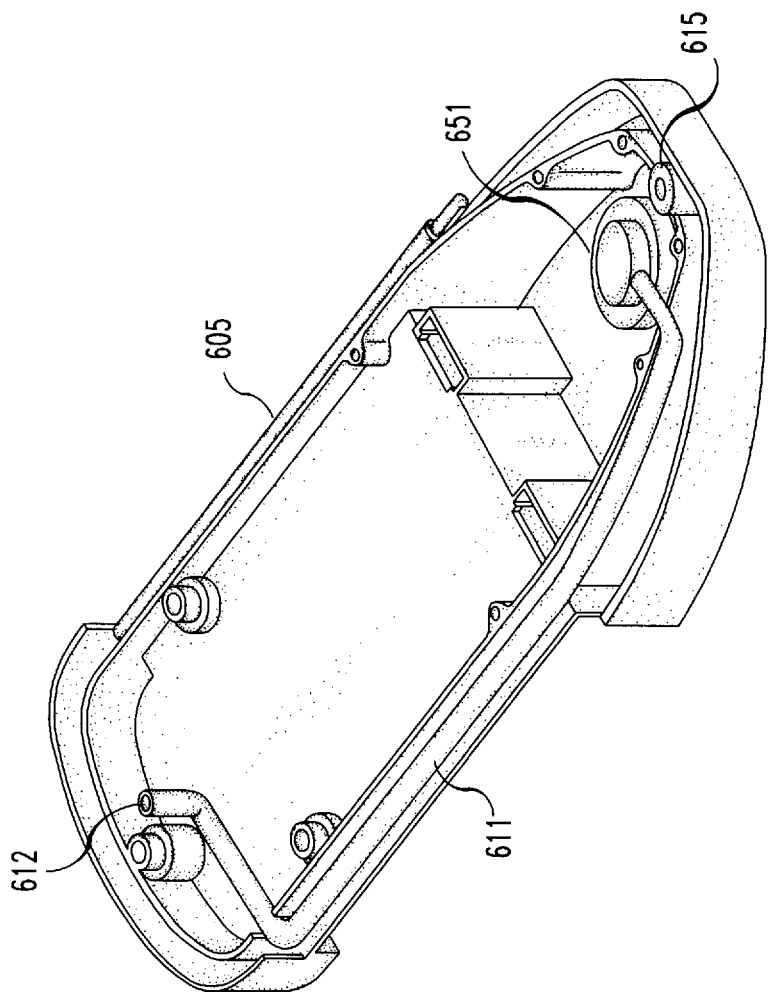
FIG. 6 is a perspective view of a lower housing assembly configured for accommodating an audio pipe, in accordance with the invention.

Referring next to FIG. 6, and in accordance with a third disclosed embodiment of the invention, there is shown a view of a lower housing assembly 605 configured to accommodate an audio pipe 611. This audio pipe 611 extends from an audio receiver 651, which is located adjacent to an audio transmitter 615 in the portable transceiver, into the vicinity of an acoustic reception area for a listener at the opposite end of the portable transceiver. The upper housing assembly 101 shown in FIG. 2 is usable with this lower housing assembly 611. The ports 110 and 150 of the upper housing assembly 101 respectively mate with the transmitter 615 and the end 612 of the audio pipe 611. A circuit board similar to circuit board 120 also may be employed in the lower housing assembly 605. However, the relative positions of the RF section and the audio section are interchanged so that the transmitter 615 and the receiver 651 are both commonly positioned near the circuitry in the audio section of the transceiver.

Figure 7:
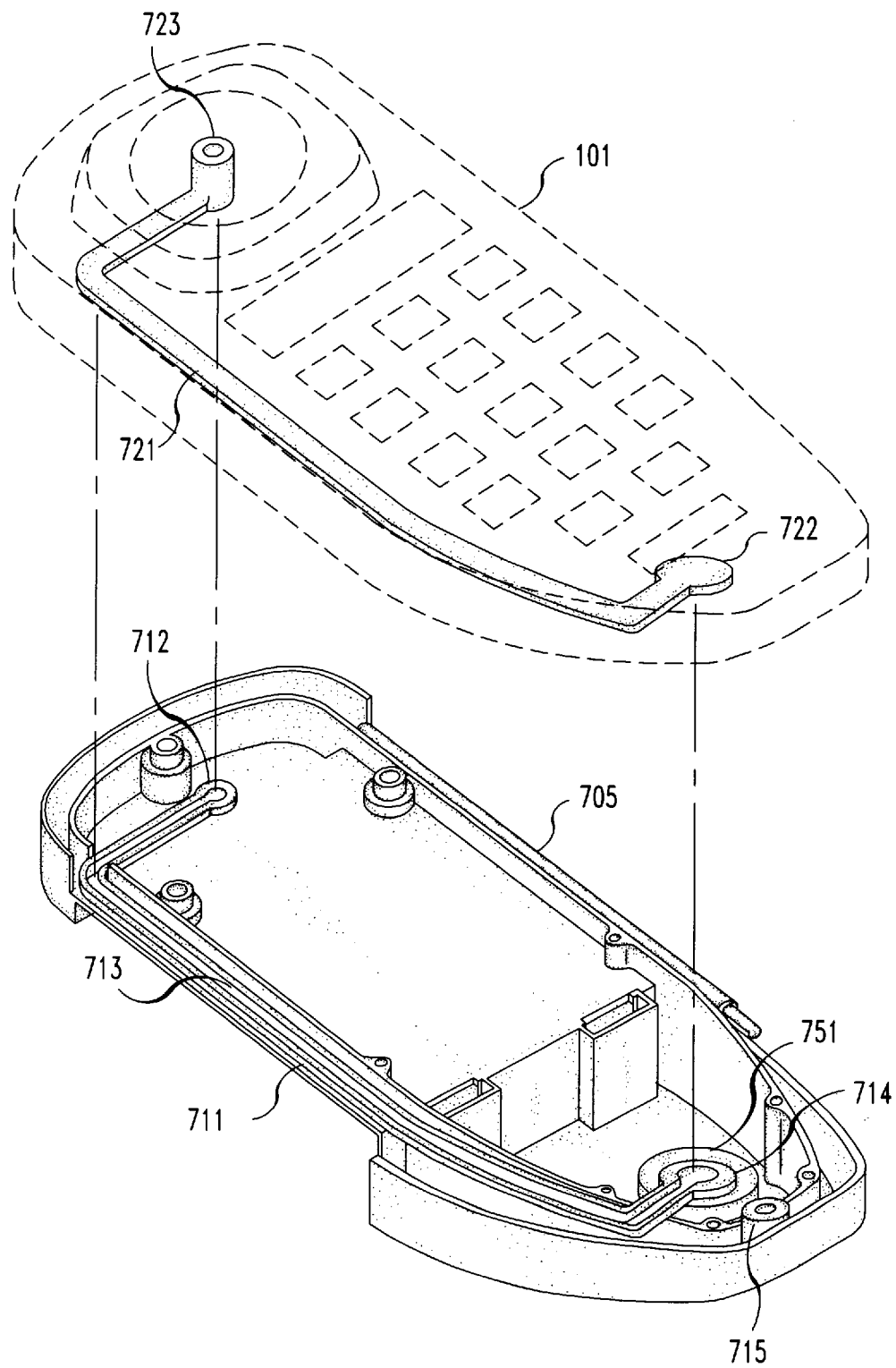
FIG. 7 is a perspective view of a lower housing assembly configured with a molded member for forming the lower portion of an audio channel and, also an upper member for molding into an upper housing assembly and forming the upper portion of the audio channel, in accordance with the invention.

Referring next to FIG. 7, and in accordance with a fourth disclosed embodiment of the invention, there is shown a view of a lower housing assembly 705 configured to accommodate a lower member 711 of an audio channel. This lower member 711 includes a groove 712 along its length and is molded into the lower housing assembly 705. The lower member 711 extends from an audio receiver 751, which is located adjacent to an audio transmitter 715 in the portable transceiver, into the vicinity of an acoustic reception area for a listener at the opposite end of the portable transceiver.

The upper housing assembly 101, shown in dotted line detail in FIG. 7 and in solid line detail in FIG. 2, is usable with this lower housing assembly 711 with the following modification. An upper member 721 having a groove (not shown but in the manner of groove 712) along its length is molded into the upper housing assembly 101 such that its groove aligns with the groove on the lower member 711 for forming an acoustic energy conducting channel when the housing of the transceiver is assembled.

The ports 110 and 150 of the upper housing assembly 101 respectively mate with the transmitter 715 and the end 723 of the upper member 721. Both the lower and upper members 711 and 721 respectively include disk-like end sections 714 and 722 for acoustically coupling to the receiver 751 when these members are positioned in opposed assembly above the receiver 751. A circuit board similar to circuit board 120 also may be employed in the lower housing assembly 705. However, the relative positions of the RF section and the audio section are interchanged so that the transmitter 715 and the receiver 751 are both commonly positioned near the circuitry in the audio section of the transceiver.

What has been described is merely illustrative of the present invention. While the embodiments of the present invention are illustratively described as being incorporated into a wireless portable transceiver, it should be recognized that the present acoustic energy coupling arrangement may be utilized in other systems wherein cross-over modulation between audio and RF frequency signals may occur. Thus, other applications to telephone, computer or other user systems are contemplated as being within the knowledge of one skilled in the art and may be utilized without departing from the spirit and scope of the present invention.

We claim:

1. A wireless portable transceiver mounted in a housing, the transceiver comprising:

a radio frequency component section for containing all radio frequency processing circuitry;

an audio frequency component section for containing all audio frequency processing circuitry;

an audio receiver and an audio transmitter for converting electronic audio frequency signals to acoustic sound signals and acoustic sound signals to electronic audio frequency signals, respectively; where said receiver and said transmitter are both adjacent to each other, and adjacent and electrically connected to said audio frequency component section; and an acoustic channel for coupling acoustic sound energy between a port in said housing and one of said audio transmitter or said audio receiver, where said port and a portion of said channel are in close proximity to said radio frequency component section;

such that said channel is implemented without electromagnetic shielding in the vicinity of said radio frequency component section, while cross-over modulation between said audio frequency component section and said radio frequency component section is minimized.

2. The wireless portable transceiver as in claim 1 wherein said acoustic channel is an audio pipe.

3. The wireless portable transceiver as in claim 1 wherein said acoustic channel is formed by a pair of mating grooves positioned in opposed assembly, the first one in said pair of mating grooves being molded into and protruding from an upper cover of said housing and the second one in the pair of mating grooves being molded into and protruding from a lower matching cover of said housing, so that, when said covers are assembled said pairs of grooves in each of said covers mate to form a barrier that substantially prevents leakage of said coupled acoustic energy from said acoustic channel.

4. The wireless portable transceiver as in claim 1 wherein said port is an input port for receiving acoustic energy input into the portable transceiver.

5. The wireless portable transceiver as in claim 4 wherein said acoustic channel couples acoustic energy from said input port to said audio transmitter.

6. The wireless portable transceiver as in claim 1 wherein said port is an output port for radiating acoustic energy from the portable transceiver.

7. The wireless portable transceiver as in claim 6 wherein said acoustic channel couples acoustic energy from said audio receiver to said output port.

\* \* \* \* \*